United States Patent
Michaelis

(10) Patent No.: US 8,121,262 B1
(45) Date of Patent: Feb. 21, 2012

(54) TEXT FEEDBACK TO AN ON-HOLD PARTY

(75) Inventor: Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 994 days.

(21) Appl. No.: 11/780,704

(22) Filed: Jul. 20, 2007

(51) Int. Cl.
*H04M 1/64* (2006.01)
*H04M 3/42* (2006.01)

(52) U.S. Cl. ................. 379/88.11; 455/415

(58) Field of Classification Search .... 379/88.11–88.15, 379/93.09, 93.11, 142.08, 207.01, 215.01, 379/263; 370/352; 455/415
See application file for complete search history.

(56) References Cited

U.S. PATENT DOCUMENTS

| | | | |
|---|---|---|---|
| 6,724,872 B1 * | 4/2004 | Moore et al. | 379/93.35 |
| 6,738,615 B1 * | 5/2004 | Chow et al. | 455/415 |
| 6,950,504 B1 * | 9/2005 | Marx et al. | 379/88.19 |
| 7,248,677 B2 * | 7/2007 | Randall et al. | 379/93.23 |
| 7,269,415 B2 * | 9/2007 | Bostrom et al. | 455/419 |
| 7,286,821 B2 * | 10/2007 | Kraft et al. | 455/415 |
| 7,746,996 B1 * | 6/2010 | Ruckart | 379/211.01 |
| 2002/0025831 A1 * | 2/2002 | Kim | 455/554 |
| 2003/0156701 A1 * | 8/2003 | Burg et al. | 379/215.01 |
| 2004/0072593 A1 * | 4/2004 | Robbins et al. | 455/560 |
| 2004/0177077 A1 * | 9/2004 | Steele | 707/100 |
| 2004/0266426 A1 * | 12/2004 | Marsh et al. | 455/426.2 |
| 2009/0219927 A1 * | 9/2009 | Hartog et al. | 370/355 |

* cited by examiner

*Primary Examiner* — Davetta W Goins
*Assistant Examiner* — Mohammad Islam
(74) *Attorney, Agent, or Firm* — Sheridan Ross P.C.

(57) ABSTRACT

A party to a call that has been put on hold is provided with textual, display, announcements while on hold, via the on-hold call. A facility of the party that put the call on hold transmits text-based status indicators that are then displayed on a display of the on-hold party's communications device.

25 Claims, 3 Drawing Sheets

TEXT FEEDBACK TO AN ON-HOLD PARTY

TECHNICAL FIELD

This invention relates to telecommunications.

BACKGROUND OF THE INVENTION

While on hold, such as while waiting in a hunt group (also referred to as a queue) of a contact center, a party to the call that has been put on hold may hear silence, music, or periodic reminders that the call is important and to stay on the line. In some cases, voiced announcements to the on-hold party provide estimates of the wait time.

One disadvantage of these arrangements is that the on-hold party must listen on the call for an indication that the far-end resource has taken the call off of hold and come on line. Having to listen to the call while waiting on-hold inconveniences the on-hold party and interferes with that party's ability to put the waiting time to good use.

Another disadvantage of these arrangements is that, in some scenarios, large amounts of network bandwidth and resources are utilized by on-hold calls. For example, if the audio encoder specified by ITU-T Recommendation G.711 is employed for the music-on-hold or for the status announcements (this being the most commonly used audio encoding algorithm for telephony applications), a transmission rate of 64,000 bits per second is required.

In packet-switching communications systems, particularly Voice over Internet Protocol (VoIP) systems, various standards organizations have proposed IP mechanisms by which voice and conversational text can be intermixed in the same phone call. For example, ITU-T Recommendation T.140 and RFC 4103 describe a mechanism by which voice and text are intermixed. Additionally, concurrent intermixing of text and voice is supported by the teletype (TTY)-on-VoIP architecture, in which text is transported on VoIP networks as RFC 2833-format descriptions of the corresponding Baudot TTY tones. Control signals and voice stream data is conveyed along the same channel in-band by using different types of packets (i.e., using different packet headers).

SUMMARY OF THE INVENTION

Generally according to the invention, a party to a call that has been put on hold is provided with textual, display, announcements while on hold, via the on-hold call. According to an aspect of the invention, a facility of the party that placed the call on hold (referred to herein as the far-end party) transmits text-based status indicators that are then displayed on the display of the on-hold party's communications device. Examples of text-based status indicators include "You are on far-end hold", "Waiting for the next available agent", "Expected wait time is five minutes," etc. The text may be refreshed as appropriate, e.g., "The expected wait time is now three minutes." Preferably, character strings that attract attention, such as strings that appear to be animated as they scroll across the display, are used to alert the on-hold party that the far-end resource is now available.

Unlike the approaches that provide auditory feedback to an on-hold party, this approach does not require the on-hold party to listen to the phone while waiting.

According to another aspect of the invention, a call with a communications device is placed on hold, and while the call is on hold, text is sent to the device via the call for display on the device. According to yet another aspect of the invention, a communications device has a call with a far end placed on hold by the far end, and while the call is on hold, the device receives text from the far end via the call, which text it then displays.

The invention is preferably implemented by using one of the mechanisms by which voice and text can be intermixed in the same phone call. This approach thus does not require the use of a special communications protocol that would provide for telephone-to-telephone signaling.

An additional benefit to the invention is that the transmission of text-on-IP requires considerably-less bandwidth than is required to transmit audio. Illustratively, the Baudot text protocol requires only seven bits per character, as compared with the sixty-four thousand bits required to transmit one second of G.711-encoded audio information, such as speech or music-on-hold.

While the invention has been characterized in terms of method, it also encompasses apparatus that performs the method. The invention further encompasses any computer-readable medium containing instructions which, when executed in a computer, cause the computer to perform the method steps.

The term "call" as used herein is intended to be construed broadly so as to encompass traditional telephony, Internet telephony communications, VoIP communications, Session Initiation Protocol (SIP) communications, multimedia communications, or other types of network traffic in a network-based communication system.

BRIEF DESCRIPTION OF THE DRAWING

These and other features and advantages of the invention will become more apparent from considering the following description of an illustrative embodiment of the invention together with the drawing, in which.

DETAILED DESCRIPTION

Figure 1:
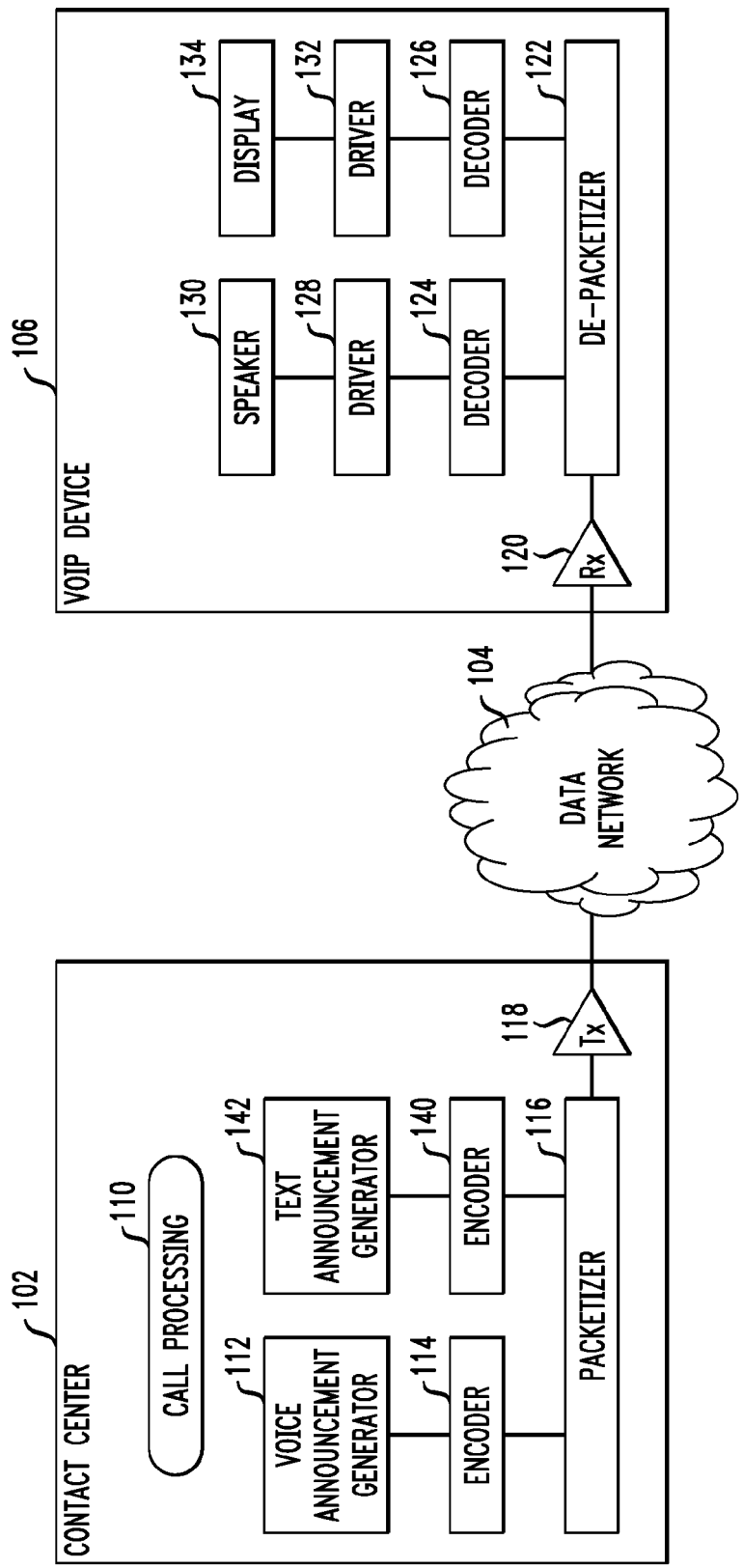
FIG. 1 is a block diagram of a first communications system that includes a first illustrative embodiment of the invention.

FIG. 1 shows a communications system that includes at least one Voice over Internet Protocol (VoIP) communications device 106, such as a wired or a wireless phone, a computer-implementing a softphone, a personal digital assistant, etc., connected by a data network 104, such as the Internet, local area network, a wide area network, etc., to a contact center 102. VoIP device 106 and contact center 102 are configured to intermix voice and text in the same conversation. Preferably, contact center 102 transmits, and VoIP device 106 receives, voice and text in the same real-time transport protocol (RTP) stream. While contact center 102 may transmit, and VoIP device 106 may receive, voice and text in separate RPT streams, the association and coordination of the separate streams into a single conversation makes this implementation less desirable.

VoIP device 106 is illustratively a stored-program-controlled device that includes a store for storing programs and data, and a processor for executing the programs and generating and/or using the data. Device 106 includes a receiver 120 for receiving an RTP packet stream from data network 104, a depacketizer 122 that determines the payload type of the received packets from a field of the header of the packets, extracts the payload, and sends each payload type to a different decoder 124, 126, a decoder 124 for decoding the audio payload and a decoder 126 for decoding the text payload, an audio driver 128 for driving a speaker 130 with the audio payload, and a display driver 132 for displaying the text payload on a display 134. VoIP device 106 is illustratively the Avaya Model 4620 IP telephone.

Contact center 102 is illustratively a stored-program-controlled entity that includes a store for storing programs and data, and a processor for executing the programs and generating and/or using the data. The stored programs include conventional contact-center call-processing software 110 that includes the ability to place contacts on-hold for a hunt group ("in queue"). The software also includes a conventional voice-announcement generator 112 for generating voice announcements that are provided to parties whose contacts are on hold. The voice announcements are conventionally coded by an encoder 114, encapsulated in RTP packets by a packetizer 116, and transmitted by a transmitter 118 via data network 104 to the on-hold party's VoIP device 106. Contact center 102 is illustratively the Avaya MultiVantage Customer Interaction Suite.

As described so far, the system of FIG. 1 is conventional.

According to the invention, contact center 102 further includes a text-announcement generator 140 for generating text announcements that are provided to parties whose contacts are on hold. The text announcements are coded by an encoder 142 into a form that is suitable for transmission via an RTP packet stream, such as any of the formats specified by the Unicode Consortium"—see, The Unicode Standard, Version 5.0, Fifth Edition, The Unicode Consortium, Addison-Wesley Professional, Oct. 27, 2006. ISBN 978-0-321-48091. For example, the encoding may be a T.140 text form. Alternatively, the announcements may be coded by encoder 142 in one or more of the formats specified by International Telecommunication Union Recommendation V.18, such as an RFC 2833 signal-generation instructions form. The coded text is supplied in parallel with the coded audio output of encoder 114 to packetizer 116, which encapsulates the coded text into RTP packets having a header field that identifies them as non-audio packets. The RTP stream is transmitted by transmitter 118 through network 104 to VoIP device 106.

Figure 2:
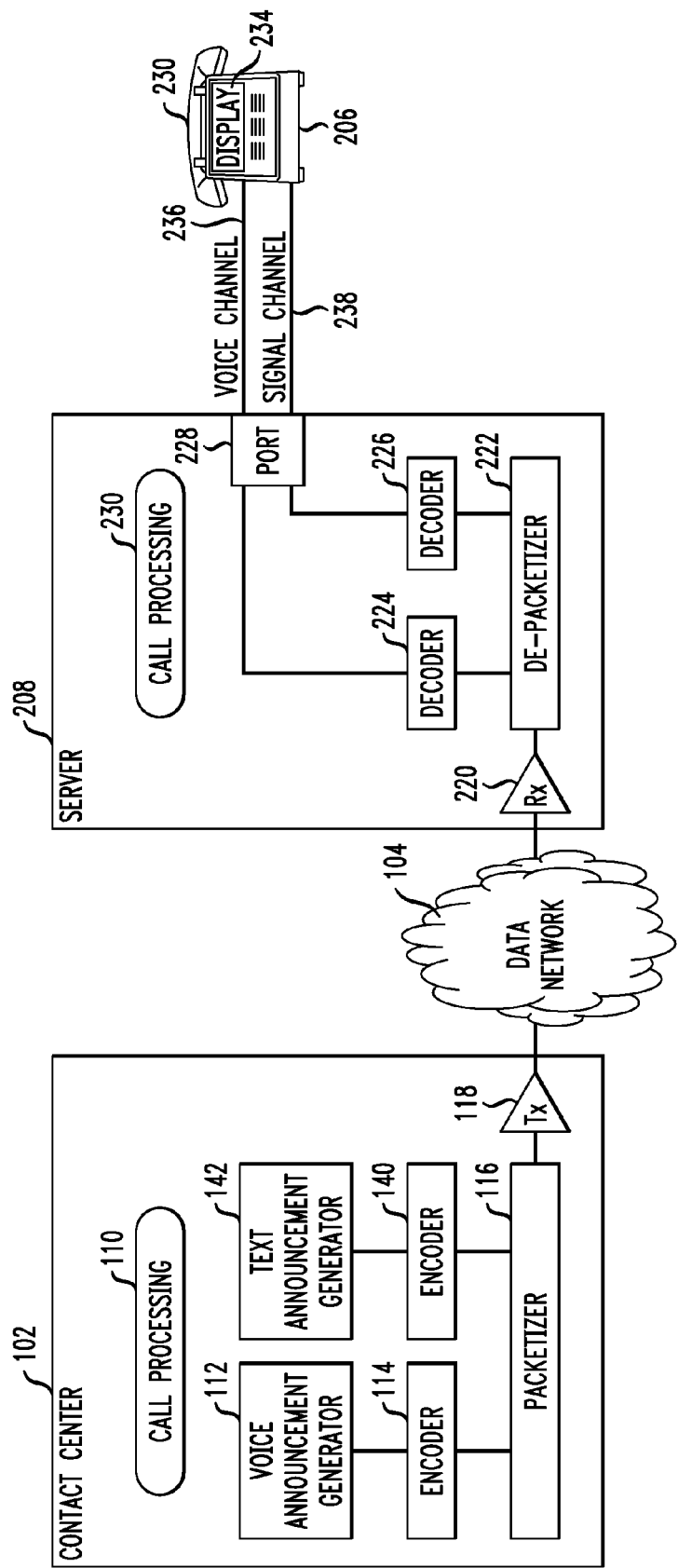
FIG. 2 is a block diagram of a second communications system that includes a second illustrative embodiment of the invention.

FIG. 2 shows an alternative communications system that includes at least one communications device 206, such as a display telephone, connected by a server 208, such as a private branch exchange (PBX) or some other telephony switch, to a data network 104 and a contact center 102. Network 104 and contact center 102 of the system of FIG. 2 duplicate the same elements of the system of FIG. 1.

Server 208 is illustratively a stored-program-controlled device that includes a store for storing programs and data, and a processor for executing the programs and generating and/or using the data. The stored programs include conventional call-processing software 230 for interconnecting telephones and other devices 206 with each other and with network 104. Server 208 includes at least one set of elements 220-226 that duplicate elements 120-126 of device 106 of the system of FIG. 1. Outputs of decoders 224 and 226 are connected to a port circuit 228 that connects to and drives communications device 206 via a voice channel 240 and a signaling channel 242, such as a B channel and a D channel, respectively, of an ISDN protocol link. Voice channel 240 conveys the audio payload of the RTP packet stream to an audio device 244 of device 206, such as the speaker of a handset, headset, or speakerphone. Signaling channel 242 conveys the text payload of the RTP packet stream to a display 246 of device 206. The text is encoded in a format that is compatible with display 246. Server 208 is illustratively the Avaya MultiVantage-controlled Gateway with TN2302AP/BP Media Processor, or the Avaya G700 Gateway with the MM760 IP Media Module. Device 206 is illustratively the Avaya Model 2420 digital telephone.

Figure 3:
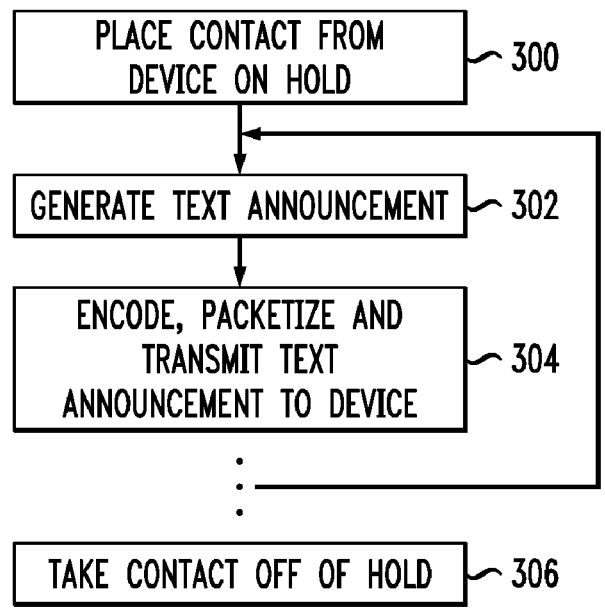
FIG. 3 is a functional flow diagram of operations of a contact center of the system of FIG. 1 or 2.
Figure 4:
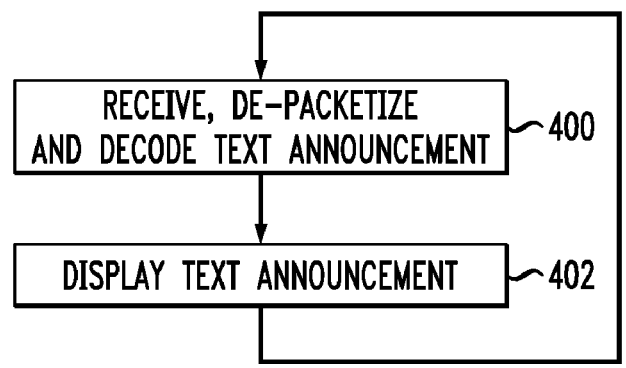
FIG. 4 is a functional flow diagram of operations of either a VoIP device of the system of FIG. 1 or a server of the system of FIG. 2.

Operation of the communication system of FIG. 1 or 2 that is relevant to an understanding of this invention is shown in FIGS. 3 and 4. FIG. 3 shows the operation of contact center 102. Contact center 102 places a contact from device 106 or 206 on hold, at step 300.

Occasionally thereafter, contact center 102 generates a text announcement, at step 302, and encodes, packetizes, and transmits the text announcement to the on-hold device 106 or 206. Contact center may also generate voice announcements and send them to device 106 or 206. Contact center 102 repeats steps 302 and 304 as needed, until it takes the contact of device 106 and 206 off of hold, at step 306.

FIG. 4 shows the operation of VoIP device 106 of FIG. 1, or the operation of server 208 and device 206 of FIG. 2. Device 106 or server 208 receives, de-packetizes, and decodes the text announcement, at step 400. Device 106 then displays, or server 208 causes device 206 to display, the text announcement, at step 402. Steps 400 and 402 are repeated for every text announcement that contact center 102 sends. VoIP device 106 or server 208 and device 206 may also receive and play any audio announcements that are sent by contact center 102.

Of course, various changes and modifications to the illustrative embodiment described above will be apparent to those skilled in the art. For example, the idea may be used to effect text messaging to the same endpoint, but via a channel other than the media or signaling stream of the phone call (notably "SMS" on cell phones). Or, it may be used with phones that have PBX-controlled status lamps but no alphanumeric display (such as the Avaya Model 6402 and 6408), which would flash their LEDs in an attention-getting manner when the far-end becomes available and/or when the far end is sending or is about to send an audio alert. Or, on phones that are video-capable, the idea may be used to send the on-hold text via the video mechanism even if the call itself is audio-only. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
   placing on hold a call with a communications device; and
   while the call and an associated voice channel are on hold, sending text to the communications device via one or more of a signaling channel and the associated voice channel, the text being sent via a real-time transmission protocol for display by the communications device, wherein the one or more of the signaling channel and associated voice channel conveys the text to a display of the communications device, wherein the text is encoded in a format compatible with the display of the communications device.

2. The method of claim 1 wherein:
   the call includes the voice channel.

3. The method of claim 2 wherein:
   the communications device is video-enabled.

4. The method of claim 1 wherein:
   the call is a VoIP call.

5. The method of claim 4 wherein:
the text is sent in packets of the real-time transmission protocol.

6. The method of claim 5 wherein:
the text is encoded in a format specified by the Unicode Consortium.

7. The method of claim 5 wherein:
the text is encoded in a format specified by the International Telecommunication Union Recommendation V.18.

8. The method of claim 1 wherein:
the text comprises an announcement, and
the method further comprises
while the call is on hold, further sending an audio announcement via the call to the device.

9. The method of claim 8 wherein:
the text announcement and the audio announcement are sent via a same real-time transmission protocol packet stream.

10. The method of claim 9 wherein:
packets of the stream that carry the text announcement have different headers from headers of packets of the stream that carry the voice announcement.

11. A method comprising:
a communications device having a call with a far end placed on hold by the far end;
while the call and an associated voice channel are on hold, the communications device receiving text from the far end via one or more of a signaling channel and the associated voice channel, the received text being sent via a real-time transmission protocol; and
the communications device displaying the received text, wherein the one or more of the signaling channel and the associated voice channel conveys the received text to a display of the communications device, the received text being encoded in a format compatible with the display.

12. The method of claim 11 wherein:
the call includes the voice channel.

13. The method of claim 12 wherein:
the communications device is video-enabled.

14. The method of claim 11 wherein:
the call is a VoIP call.

15. The method of claim 14 wherein:
the text is sent in packets of the real-time transmission protocol.

16. The method of claim 15 wherein:
the text is encoded in a format specified by the Unicode Consortium.

17. The method of claim 15 wherein:
the text is encoded in a format specified by the International Telecommunication Union Recommendation V.18.

18. The method of claim 11 wherein:
the text comprises an announcement, and
the method further comprises
while the call is on hold, the communications device receiving an audio announcement from the far end via the call, and
the communications device playing the audio announcement.

19. The method of claim 18 wherein:
the text announcement and the audio announcement are received via a same real-time transmission protocol packet stream.

20. The method of claim 19 wherein:
packets of the stream that carry the text announcement have different headers from headers of packets of the stream that carry the voice announcement.

21. An apparatus comprising:
means for placing on hold a call with a communications device;
a source of text;
a transmitter for sending the text to the communications device via one or more of a signaling channel and an associated voice channel while the call, and the associated voice channel are on hold, the text being sent via a real-time transmission protocol, for display by the communications device, wherein one or more of the signaling channel and associated voice channel conveys the text to a display of the communications device, the text being encoded in a format compatible with the display.

22. The apparatus of claim 21 wherein:
the transmitter is adapted to send audio of the call via the voice channel.

23. The apparatus of claim 21 wherein:
the call is a VoIP call.

24. The apparatus of claim 21 wherein:
the text comprises an announcement;
the apparatus further comprises a source of an audio announcement; and
the transmitter is further for sending the audio announcement to the device via the call while the call is on hold.

25. The apparatus of claim 24 wherein:
the call is a VoIP call; and
the transmitter is adapted to send the text announcement and the audio announcement via a same real-time transmission protocol packet stream.

\* \* \* \* \*